United States Patent [19]

Ohmura

[11] Patent Number: 5,850,578
[45] Date of Patent: *Dec. 15, 1998

[54] LIGHT-PROJECTING SYSTEM FOR AUTOMATIC FOCUS DETECTION

[75] Inventor: Yusuke Ohmura, Yokohama, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 527,088

[22] Filed: Sep. 12, 1995

[30] Foreign Application Priority Data

Sep. 14, 1994 [JP] Japan .................................. 6-247048
Dec. 15, 1994 [JP] Japan .................................. 6-333298

[51] Int. Cl.⁶ .......................... G03B 13/00; G03B 15/03
[52] U.S. Cl. ........................................ 396/109; 396/106
[58] Field of Search ........................... 354/403; 396/106, 396/109

[56] References Cited

U.S. PATENT DOCUMENTS

| | | |
|---|---|---|
| 4,801,963 | 1/1989 | Koyama et al. ........................ 354/403 |
| 4,958,180 | 9/1990 | Matsui et al. ........................... 354/403 |
| 4,963,911 | 10/1990 | Matsui et al. ........................... 354/403 |
| 5,150,146 | 9/1992 | Ueda et al. ............................. 354/403 |
| 5,305,047 | 4/1994 | Hayakawa et al. . |

*Primary Examiner*—Russell E. Adams
*Attorney, Agent, or Firm*—Fitzpatrick, Cella, Harper & Scinto

[57] ABSTRACT

A light-projecting system for illuminating a central portion of a screen and a pair of peripheral portions on either side of the central portion in order to perform focus detection for each of the central portion and the pair of peripheral portions, comprises a first pattern for forming first illumination light for illuminating the central portion of the screen, and a second pattern common to the pair of peripheral portions, for forming second illumination light and third illumination light, different in light intensity distribution from the first illumination light, for illuminating the pair of peripheral portions separately, thereby providing the light-projecting system for automatic focus detection, permitting high-accuracy focus detection by expanding the illumination range.

39 Claims, 7 Drawing Sheets

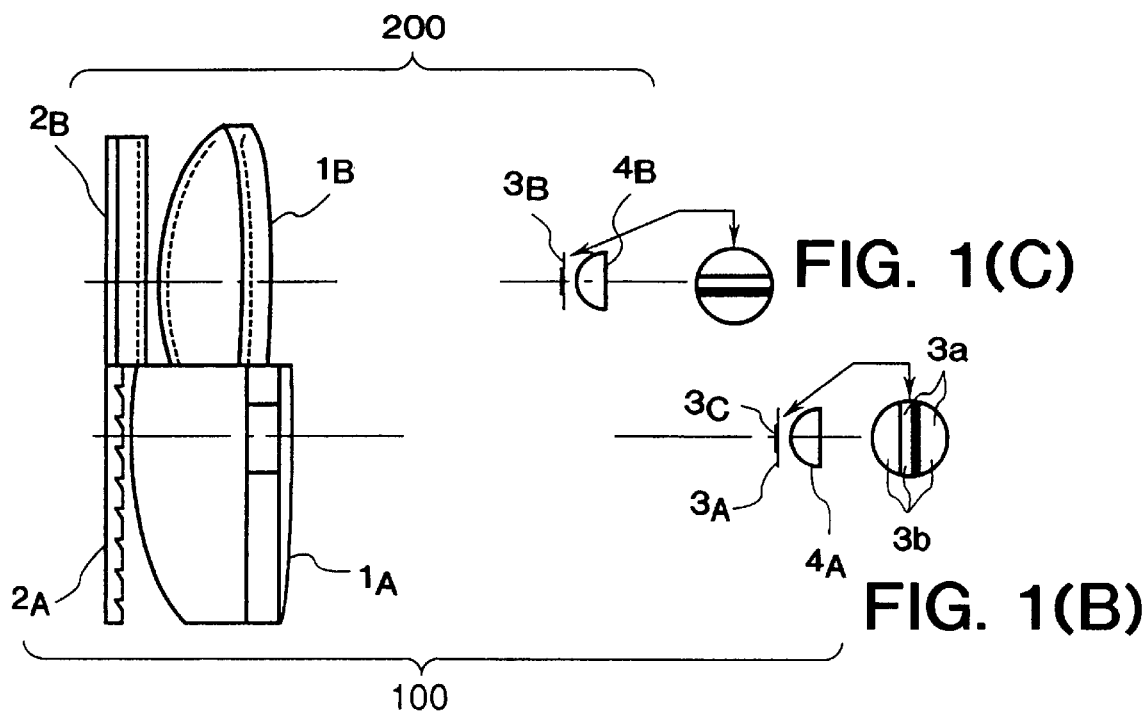
FIG. 1(A)
FIG. 1(B)
FIG. 1(C)
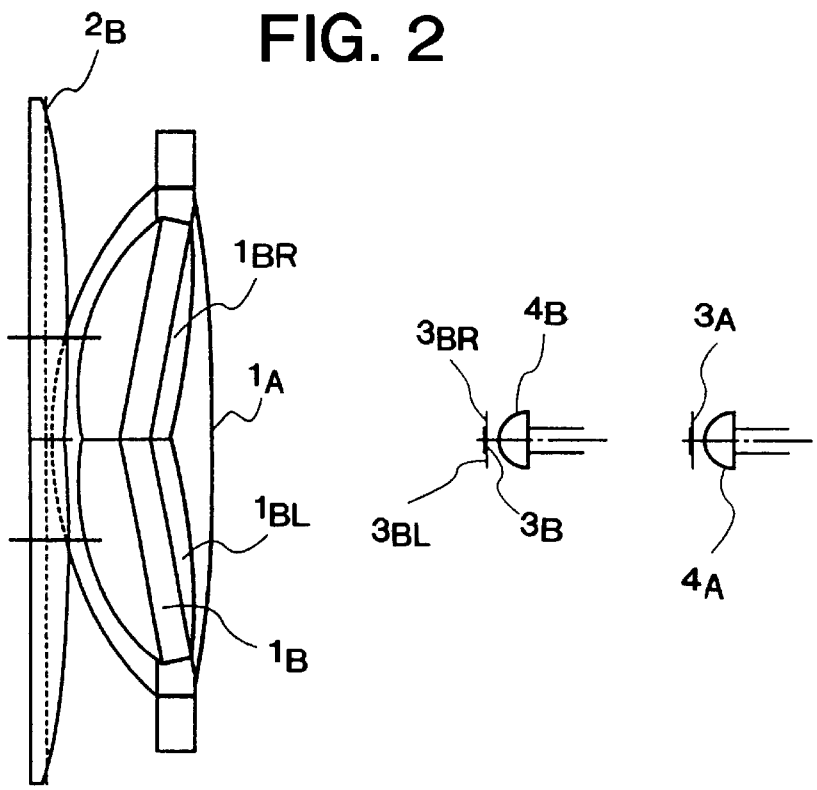
FIG. 2

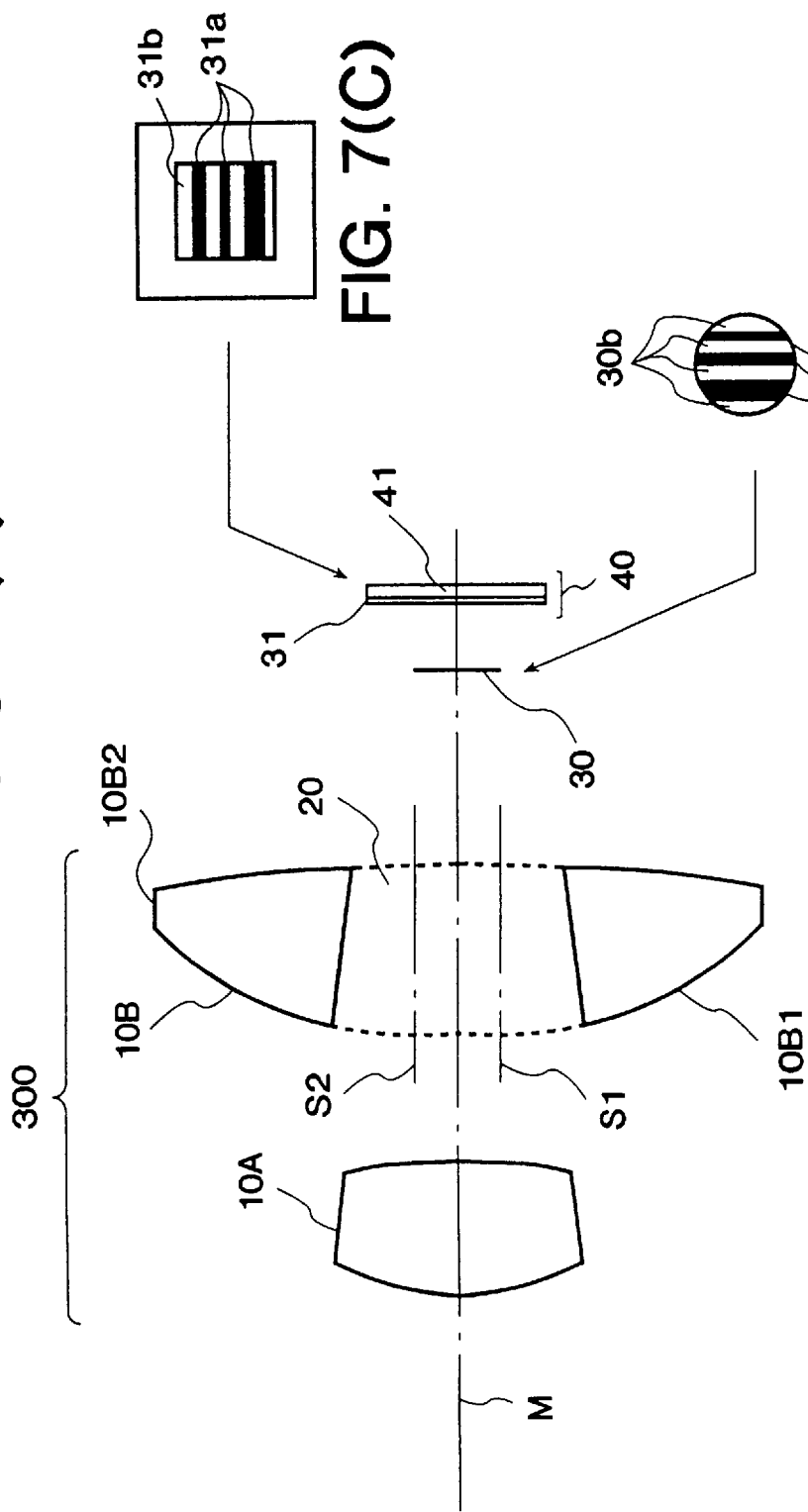

LIGHT-PROJECTING SYSTEM FOR AUTOMATIC FOCUS DETECTION

BACKGROUND OF THE INVENTION

1. Field of the Invention

The present invention relates to a light-projecting system for automatic focus detection, and more particularly to a light-projecting system employing active focus detection, which is arranged to project a projection pattern (hereinafter also referred to as a pattern) toward an object and then to receive an image of the projection pattern reflected by the object to perform detection of focus of a taking system, which is improved in accuracy of focus detection while having an expanded illumination range, and which is suitable, for example, for use with automatic focus-detecting apparatus in TTL type cameras.

2. Related Background Art

There were conventional focus-detecting apparatus for TTL type cameras such as photographic cameras, cinecameras, and video cameras, which were constructed in such an arrangement that, for example, if an object had a low luminance or a low contrast upon focus detection, an auxiliary illuminating apparatus (light-projecting system), which was built in a camera body or a flash device and in which a projecting lens and a projection pattern of a fixed figure were incorporated, was activated to project the projection pattern onto the object to give a contrast thereon, thereby permitting focus detection to be performed.

Most of the above focus-detecting apparatus have their area of focus detection located in the center of a photographic screen (a portion near the optical axis of a taking lens), and the light-projecting systems thereof are arranged to illuminate only the center of the object except in the case of correction of parallax, etc.

Since, in the recent automatic focus detection function, a demand is high for focus detection in an area other than the center of, screen and the area of focus detection of the camera tends to increase so as to cover more points and a wider range of detection, emerging are TTL type cameras having an area of focus detection also in the periphery of the photographic screen of the taking lens as well as the center area. In the cameras of this type, the area of focus detection on the object side differs depending upon the focal length of the taking lens thereof. For example, since a taking lens with a relatively long focal length has a small photographic region of an object, the peripheral area of focus detection is close to the center of the photographic region; but the peripheral area of focus detection on the object side becomes considerably away from the center of the photographic range as the focal length of the taking lens becomes shorter.

Accordingly, in the cases of cameras having the focus detection area also in the peripheral region among the cameras with an interchangeable taking lens and the cameras with a lens of a variable focal length being mounted, the auxiliary illuminating apparatus (light-projecting system) for automatic focus detection needs to illuminate the object in a wide range.

For that, for example, proposed is the light-projecting system for automatic focus detection as shown in FIG. 12. In the figure, a light-projecting lens 122 is arranged to project an image of a light source unit 124 itself, in which a light source (light emitting portion) 124a comprised of an LED, etc., and a projection pattern 124b are incorporated, onto an object. In this arrangement, light beams from the entire projection pattern 124b are projected through lens portions 122a, 122b, 122c.

However, because the projection pattern 124b on the light source 124a is projected through the plural lenses 122a, 122b, 122c in the light-projecting system shown in FIG. 12, the same patterns as the projection pattern 124b on the light source 124a are projected onto the object on the projected side in the same number as the number of lenses. In this case, the pattern in the central area of the object is the same as those in the peripheral areas, and the light-projecting system does not permit projection of different patterns between the central area and in the peripheral area. A related United States patent is U.S. Pat. No. 5,305,047. Meanwhile, with a camera having a focus detecting unit for performing focus detection by detecting a phase difference between two images, where a direction of detection of the phase difference in the central area of the object is different from that in the peripheral area, it is necessary to project a different pattern to the peripheral area from that to the center area. Therefore, the light-projecting system shown in FIG. 12 had a problem in that it was incapable of performing high-accuracy focus detection.

SUMMARY OF THE INVENTION

An object of the present invention is to provide a light-projecting system for automatic focus detection, which is capable of performing high-accuracy focus detection for all focus areas with a wide illumination range.

A light-projecting system of the present invention for illuminating a central portion of a screen and a pair of peripheral portions on either side of the central portion in order to perform focus detection for each of the central portion and the pair of peripheral portions, comprises:

a first pattern for forming first illumination light for illuminating the central portion of the screen; and a second pattern common to the pair of peripheral portions, for forming second illumination light and third illumination light, different in light intensity distribution from the first illumination light, for illuminating the pair of peripheral portions separately.

Further, a light-projecting system of the present invention for illuminating a central portion of a screen and a pair of peripheral portions on either side of the central portion in order to perform focus detection for each of the central portion and the pair of peripheral portions, comprises:

a first pattern for forming first illumination light for illuminating the central portion of the screen;

a first light-projecting lens for projecting the first pattern to the central portion of the screen;

a second pattern common to the pair of peripheral portions, for forming second illumination light and third illumination light, different in light intensity distribution from the first illumination light, for illuminating the pair of peripheral portions separately; and a second light-projecting lens for projecting the second pattern to the pair of peripheral portions.

Further, in the light-projecting system of the present invention, a focal length of the second light-projecting lens is preferably shorter than that of the first light-projecting lens.

Further, in the light-projecting system of the present invention, the system is preferably so arranged that the focus detection for the central portion is one to detect a phase difference in a first direction between two images, the focus detection for the peripheral portions is one to detect a phase difference in a second direction perpendicular to the first direction between the two images, a light intensity distribution of the first illumination light has periodicity in the first direction, and light intensity distributions of the second illumination light and third illumination light have periodicity in the second direction.

Further, in the light-projecting system of the present invention, the second light-projecting lens preferably has a lens with a refractive power stronger in the second direction than in the first direction.

Further, in the light-projecting system of the present invention, the first pattern is preferably disposed near a position of a focal point of the first light-projecting lens and the second pattern is preferably disposed near a position of a focal point of the second light-projecting lens.

Further, the light-projecting system of the present invention preferably has means for partially deflecting the first illumination light.

The light-projecting system for automatic focus detection according to the present invention is most suitably used when built in a flash device, a camera, or the like.

BRIEF DESCRIPTION OF THE DRAWINGS

FIG. 1(A) is a schematic drawing (side view) of the major part of Embodiment 1 of the present invention, while FIGS. 1(B) and 1(C) show examples of patterns;

FIG. 2 is a schematic drawing (plan view) of the major part of Embodiment 1 of the present invention;

FIG. 7(A) is a schematic drawing of the major part of Embodiment 2 of the present invention, while FIGS. 7(B) and 7(C) show examples of patterns;

DETAILED DESCRIPTION OF THE PREFERRED EMBODIMENTS

Figure 3:
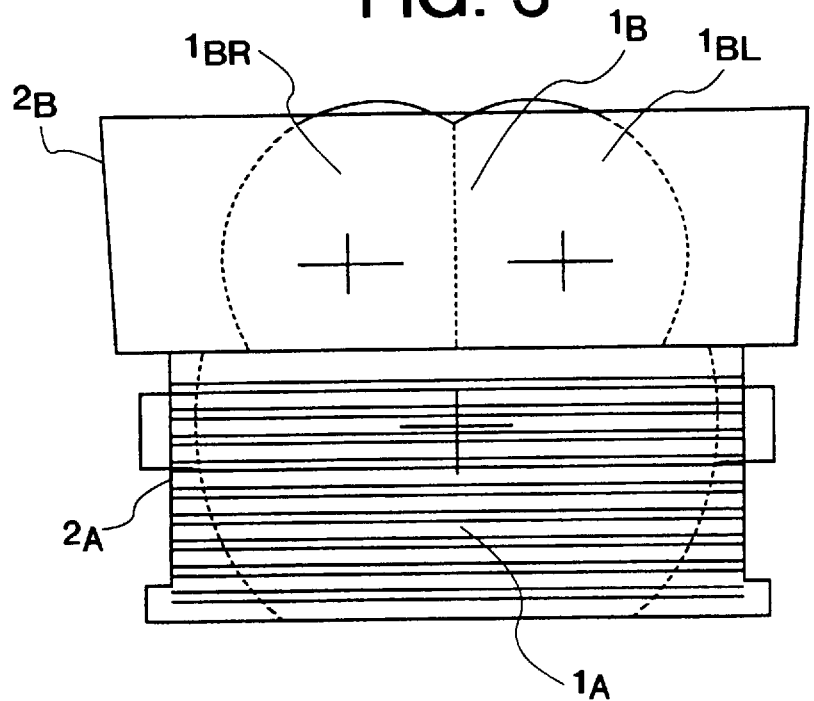
FIG. 3 is a schematic drawing (front elevation) of the major part of Embodiment 1 of the present invention.

FIGS. 1(A) to 3 are schematic drawings (a side view, a plan view, and a front elevation, respectively) of the major part of Embodiment 1 of the present invention. In the drawings, reference numeral 100 designates a center light-projecting system, and 200, a periphery light-projecting system. Further, $4_A$ represents a light emitting member (first light source) as a light source, which is almost a point light source and is comprised, for example, of an LED, etc. Reference code $3_A$ denotes a projection pattern (first pattern), and the projection pattern $3_A$ is composed of light-shielding portions $3a$ and light-transmitting portions $3b$ of plural linear vertical bands, as shown in the front elevation of an example of the pattern in FIG. 1(B). Reference code $1_A$ denotes a central-area light-projecting lens (first light-projecting lens), which projects an image of the projection pattern $3_A$ to a distance suitable for focus detection. Reference code $2_A$ is a panel (prism member), which has partly wedge-shaped fine prism portions to split part of the light projected by the central-area light-projecting lens $1_A$ and to guide the split part to the near distance side.

The light emitting member $4_A$, the projection pattern $3_A$, the central-area light-projecting lens $1_A$, and the panel $2_A$ each are elements constituting the center light-projecting system 100.

In the next place, $4_B$ designates a light emitting member (second light source), which is almost a point light source and is comprised, for example, of an LED, etc. Further, $3_B$ denotes a projection pattern (second pattern), and the projection pattern $3_B$ is composed of light-shielding portions $3a$ and light-transmitting portions $3b$ of plural linear horizontal bands, as shown in a front elevation of an example of the pattern in FIG. 1(C). Reference code $1_B$ is a peripheral-area light-projecting lens (second light-projecting lens), which is composed of two light-projecting lenses $1_{BR}$ and $1_{BL}$ disposed separately on the left and the right, as seen from FIG. 2, and which projects images of the projection pattern $3_B$ to left and right peripheral areas of an object. Reference code $2_B$ is a cylindrical lens, which forms images of the projection pattern $3_B$ by expanding them horizontally (in the horizontal directions on the screen).

The light emitting member $4_B$, the projection pattern $3_B$, the peripheral-area light-projecting lens $1_B$, and the cylindrical lens $2_B$ each are elements constituting the periphery light-projecting system 200. The periphery light-projecting system 200 is disposed adjacent to the center light-projecting system 100 in the vertical direction of screen.

Figure 4:
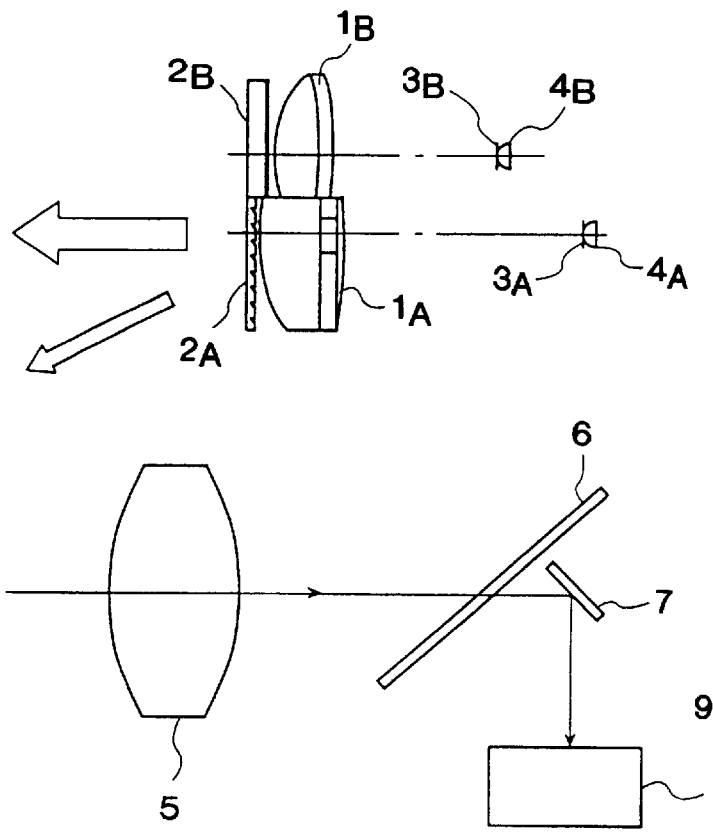
FIG. 4 is a schematic drawing of the major part where Embodiment 1 of the present invention is applied to a camera with a TTL automatic focus detection function.
Figure 5:
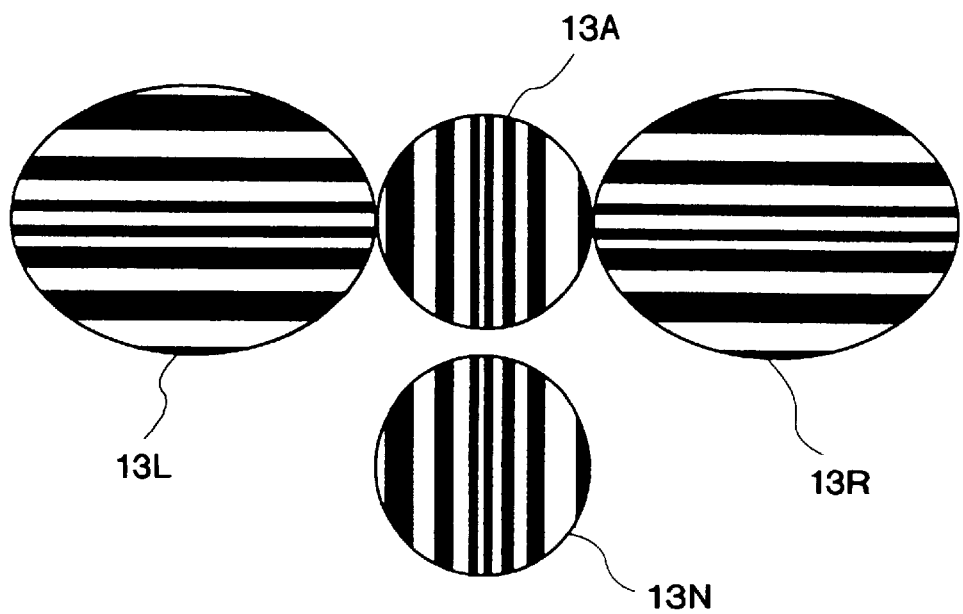
FIG. 5 is an explanatory drawing of images of projection patterns by Embodiment 1 of the present invention.

FIG. 4 is a schematic drawing of the major part wherein the present embodiment is applied to a camera (a taking system) with the TTL automatic focus detection function. Further, FIG. 5 is an explanatory drawing of images of the projection patterns when the projection patterns (different from those in FIG. 1) are projected to the object by the light-projecting system of the present embodiment.

Next explained is the operation of the present embodiment.

In the present embodiment, the center light-projecting system 100 projects an image of the projection pattern $3_A$ to the central area of an object, while the periphery light-projecting system 200 projects images of the projection pattern $3_B$ to left and right peripheral areas in the screen on the object side.

Figure 6:
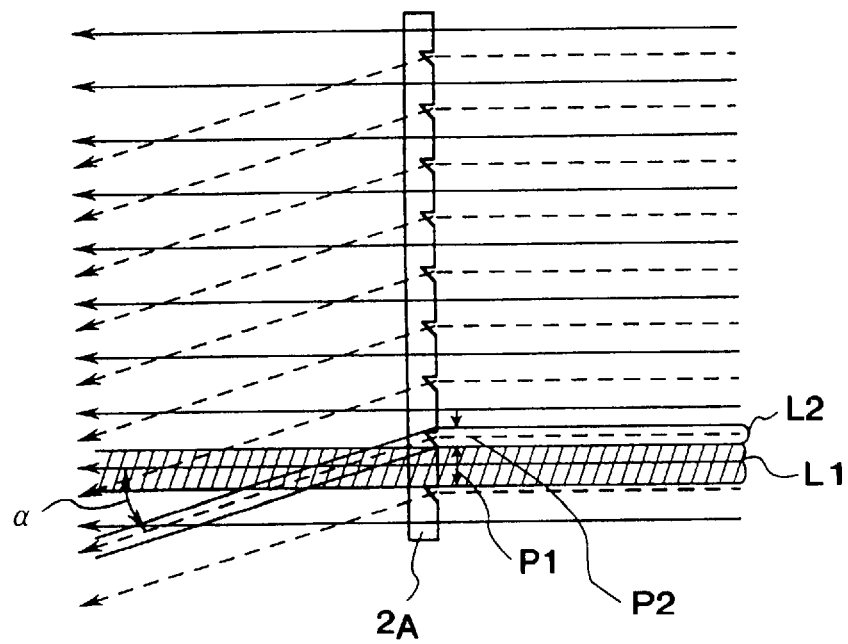
FIG. 6 is a sectional view of panel 2A.

First explained is the center light-projecting system 100. The projection pattern $3_A$ is located nearly at the focal point of the central-area light-projecting lens $1_A$, and is illuminated by the light source $4_A$. Accordingly, an image of the part of $3_C$ within the projection pattern $3_A$ is formed in the far central area on the object side, as represented by 13A in FIG. 5. Further, the panel $2_A$ is one having the fine prism portions, a cross section of which is shown in FIG. 6, and is located on the object side of the central-area light-projecting lens $1_A$. Accordingly, when the light-projecting system of the present invention is incorporated in a flash device or the like as arranged above the optical axis of the taking lens 5, part of the flash light is split by the prism portions of the panel $2_A$ to illuminate an object on the near distance side. This action is next explained. In FIG. 6, a portion of P1 is a plane-parallel portion consisting of planes normal to the light-projecting direction, and a beam L1 of projected light passing this portion is transmitted without changing the direction. On the other hand, a beam L2 of projected light entering the prism portion P2 is deflected by the prism portion to be emergent in a direction inclined at an angle α to the light beam L1 in the vertical direction. Accordingly, a partial beam in the light beam emitted from the center light-projecting system 100 through the panel $2_A$ is deflected toward the taking lens 5, and if there is an object located at a very near distance, an image 13N of the part of $3_C$ within the projection pattern $3_A$ is projected to the central portion of the object.

Next explained is the function of the periphery light-projecting system 200. The projection pattern $3_B$ is located nearly at the focal point of the peripheral-region light-projecting lens $1_B$, and is illuminated by the light source $4_B$. Since the peripheral-area light-projecting lens $1_B$ is composed of the two light-projecting lenses $1_{BR}$ and $1_{BL}$, an image 13R of the portion of $3_{BR}$ and an image 13L of the portion of $3_{BL}$ within the projection pattern $3_B$ are formed left and right around the object in the far field on the object side, as shown in FIG. 5.

FIG. 4 is a schematic drawing of the major part wherein the present embodiment is applied to a camera (taking system) with a TTL automatic focus detection function. In FIG. 4, the same elements will be denoted by the same reference numerals as those shown in FIG. 1.

In FIG. 4, reference numeral 5 designates a taking system (taking lens), which forms an image of an object on an image plane 9 such as a film or an image pickup device and which guides an image of an object illuminated by natural light such as the sunlight (in the case of the passive method) or an image of the projection pattern projected onto the object by the light-projecting system (in the case of the active method) through a semi-transparent surface of a quick return mirror 6 and via a submirror 7 to a focus detecting unit (light-receiving system) 8 as described below.

The focus detecting unit 8 detects an image signal concerning the object image obtained through the taking system 5 or detects a reflected pattern image of the projection pattern projected toward the object by the light-projecting system if the object is dark, and performs focus detection of the taking system 5 by a well-known focus detection method.

For focus detection with the focus detecting unit 8, the camera of the present embodiment is so arranged that in normal operation a light beam based on the object image entering the taking system 5 is guided through the semi-transparent surface of the quick return mirror 6 and via the submirror 7 to the focus detecting unit 8, which performs focus detection, and that, for example, if the luminance of the object is not enough for focus detection or if the contrast of the object is too low to perform focus detection by the passive method, the light emitting members $4_A$, $4_B$, disposed inside the light-projecting system built, for example, in the camera body or an external flash device, are activated based on a signal from the focus detecting unit 8 to project the projection pattern $3_A$ to the central area of the object and the projection pattern $3_B$ to the left and right peripheral areas.

Then, the images of the projection patterns from the object are guided by the taking system 5 via the semi-transparent surface of the quick return mirror 6 and the submirror 7 to the focus detecting unit 8, and the focus detecting unit 8 detects imaging states of the projection pattern images thus formed to effect focus detection of the taking system 5.

A known example of the method for detecting the imaging states of the projection pattern images to detect the focus of the taking system 5 on this occasion is one for forming two second object images from a light beam having passed through the taking system 5 and detecting a shift amount between relative positions thereof.

Since, in the present embodiment, the focal length of the peripheral-area light-projecting lens $1_B$ is set shorter than that of the central-area light-projecting lens $1_A$, the images 13R, 13L of the projection pattern $3_B$ projected to the peripheral areas can be made greater than the image 13A in the central area even in the arrangement where the peripheral-area light-projecting lens $1_B$ is composed of two lenses adjacent to each other.

Figure 12:
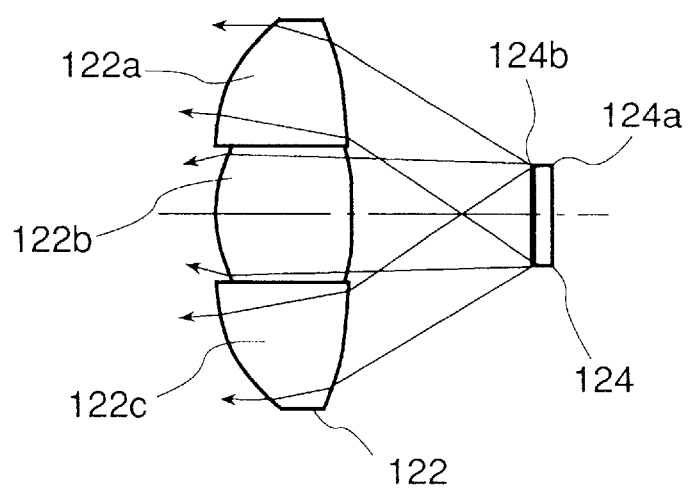
FIG. 12 is a schematic drawing of the major part of a conventional light-projecting system for automatic focus detection.

Further, because the center light-projecting system 100 and the periphery light-projecting system 200 are separately arranged up and down (in the vertical direction of the screen) and the periphery light-projecting system 200 is an optical system for projecting light only to the left and right peripheral areas, the size of the individual light-projecting lenses $1_{BR}$, $1_{BL}$ for projecting light to the peripheral areas can be made greater than the light-projecting lenses 122a and 122c in the light-projecting lens 122 in the conventional example (FIG. 12), thereby increasing the size of the effective illumination portions of the projection pattern.

Further, the cylindrical convex lens $2_B$ with a refractive power in the horizontal direction of the screen is disposed adjacent to the peripheral-area light-projecting lens $1_B$. This results in horizontally expanding the images of the projection pattern $3_B$ projected to the peripheral areas of the object by the periphery light-projecting system 200 and further enhancing the performance of the focus detection in the peripheral portions of object. Taking an arrangement of an anamorphic converter by locating a cylindrical concave lens away from the light-projecting lens farther than the cylindrical convex lens $2_B$ is on the object side, the focal length of the peripheral-area light-projecting lens $1_B$ can be further shortened, which advantageously expands the images projected to the peripheral portions of the object further in the horizontal direction.

Another embodiment of the present invention is next explained.

Figure 8:
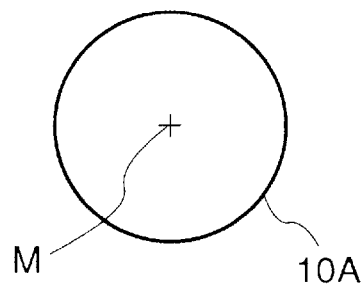
FIG. 8 is a front elevation of a first light-projecting lens shown in FIG. 7.
Figure 9:
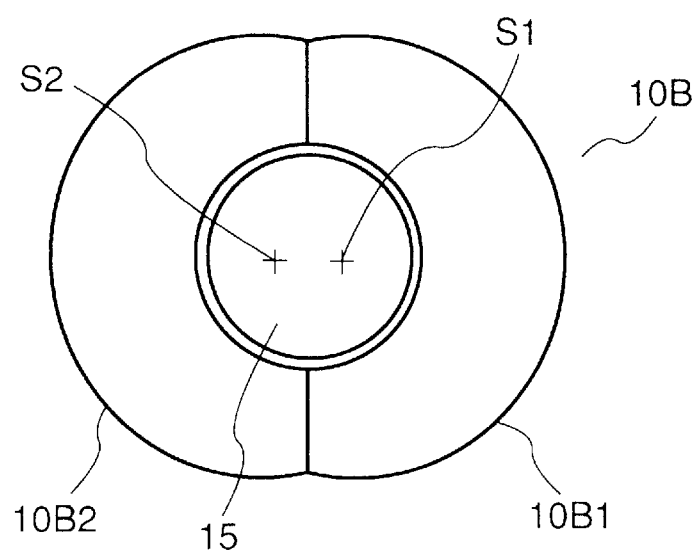
FIG. 9 is a front elevation of a second light-projecting lens shown in FIG. 7.
Figure 10:
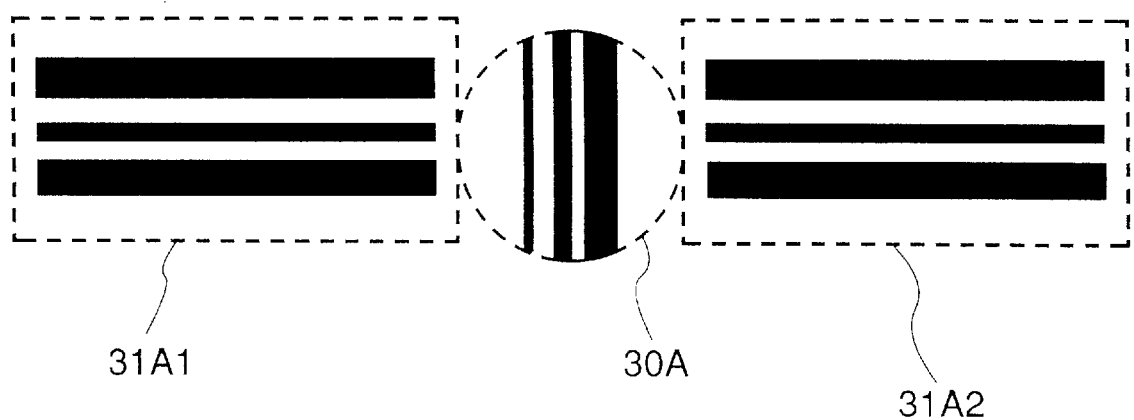
FIG. 10 is an explanatory drawing of images of projection patterns by Embodiment 2 of the present invention.

FIG. 7(A) is a schematic drawing (side view) of the major part of Embodiment 2 of the present invention, FIG. 8, a front elevation of a first light-projecting lens shown in FIG. 7(A), FIG. 9, a front elevation of a second light-projecting lens shown in FIG. 7(A), and FIG. 10, an explanatory drawing to show projection ranges and projection pattern images when the light-projecting system of the present embodiment projects the projection patterns to the object.

In the drawings, reference numeral 40 designates a light source unit (pattern light source) for projection of light, which is composed of a unified arrangement of a light emitting portion (light source) 41, for example, comprised of an LED, etc., and a second pattern (projection pattern) 31 having light-shielding portions 31a and light-transmitting portions 31b consisting of plural linear horizontal bands as shown in FIG. 7(B). The light source unit 40 in the present embodiment is located near the position of the focal point of a peripheral-area light-projecting lens 10B as a second light-projecting lens as described below.

Numeral 30 denotes a first pattern (projection pattern), which has light-shielding portions 30a and light-transmitting portions 30b consisting of plural linear vertical bands as shown in FIG. 7(A) and which is illuminated by the light source unit 40. The projection pattern 30 in the present embodiment is disposed near the position of the focal point of a central-area light-projecting lens 10A as a first light-projecting lens as described below. Here, the first pattern 30 may be constructed of light-shielding portions and light-transmitting portions consisting of plural linear horizontal bands.

Numeral 300 represents a light-projecting lens portion, which has the central-area light-projecting lens 10A and the peripheral-area light-projecting lens 10B in the stated order from the object side and which is so arranged in the present embodiment that the focal length of the peripheral-area light-projecting lens 10B is shorter than that of the central-area light-projecting lens 10A.

The central-area light-projecting lens 10A projects an image of the first pattern 30 to the central area of the screen on the object side.

The peripheral-area light-projecting lens 10B has at least two optical axes S1, S2 offset from the optical axis of the central-area light-projecting lens 10A (the center axis of the light-projecting system) M, has two light-projecting lenses 10B1, 10B2 corresponding to the two offset optical axes S1, S2, and has an aperture portion (hole portion) 20 of a predetermined shape, through which a light beam of the center light-projecting system as described below passes, near the central portion of the peripheral-area light-projecting lens 10B, i.e., near the optical axis M of the central-area light-projecting lens 10A. In the present embodiment, the two light-projecting lenses 10B1, 10B2 composing the peripheral-area light-projecting lens 10B project the second pattern 31 of the light source unit 40 to at least two peripheral areas in the horizontal direction of the screen on either side of the screen center on the object side.

Here, the elements of light source unit 40, first pattern 30, and central-area light-projecting lens 10A compose the center light-projecting system, while the elements of light source unit 40 and second light-projecting lens 10B compose the periphery light-projecting system.

In the present embodiment as so arranged, the center light-projecting system projects the first pattern 30 to the central area of the object, while the periphery light-projecting system projects the second pattern 31 to the left and right peripheral areas on either side of the the central area of object. This arrangement enables the present embodiment to project the different projection patterns to the central area and peripheral areas of the object with a single light source while expanding the illumination range.

Next explained is the operation of the present embodiment. First explained is light projection to the central area of the object. The first pattern 30 is located near the position of the focal point of the central-area light-projecting lens 10A as described above, and is illuminated by the light source unit 40. On this occasion, the first pattern 30 can be almost uniformly illuminated by the light source unit 40 insofar as the first pattern 30 is located apart at a certain distance from the light source unit 40.

Accordingly, an image of the first pattern 30 illuminated passes through the aperture portion 20 in the peripheral-area light-projecting lens 10B to be projected to the central area of the object by the central-area light-projecting lens 10A, thus forming a projection image as represented by 30A in FIG. 10, on the object.

Next explained is light projection to the peripheral areas of the object. The light source unit 40 having the second pattern 31 shown in FIG. 7(B) is located near the position of the focal point of the peripheral-area light-projecting lens 10B, as described previously. The peripheral-area light-projecting lens 10B is composed of the two light-projecting lenses 10B1, 10B2 having the optical axes S1, S2 offset from the optical axis M of the center light-projecting system, as represented by S1, S2 in FIG. 9.

Accordingly, projection images of the light source unit 40 having the second pattern 31 are projected to the left and right peripheral areas on either side of the central area of the object by the peripheral-area light-projecting lens 10B, thus forming the projection images as represented by 31A1, 31A2 in FIG. 10, on the object.

If, in the present embodiment, the second pattern of the light source unit 40 should be projected through the transmitting portions 30b in the first pattern 30 by the central-area light-projecting lens 10A, the second pattern 31 of the light source unit 40 would be blurred so as not to be observed because the first pattern 30 is located away from the light source unit 40.

As described above, the present embodiment can project the different projection patterns to the central area and peripheral areas of the object using only one light source while expanding the illumination range. Particularly, a distance-measurement error is prevented in the peripheral detection areas by projecting the second pattern 31 consisting of the patterns shown in FIG. 7(B), to the peripheral areas of the object, thereby permitting high-accuracy focus detection to be performed for all focus detection areas.

The present embodiment was so arranged that the aperture portion 20 of the predetermined shape was provided in the central portion of the peripheral-area light-projecting lens 10B (near the optical axis M of the center light-projecting system), but the present invention can also be applied, similarly as in Embodiment 2 as discussed above, to arrangements in which the aperture portion 20 is replaced by an optical member without a lens function (refractive power), for example, comprised of a plane-parallel glass, etc.

The present embodiment may be modified in such a manner that an optical member with refractive power is set in the aperture portion 20 and the first pattern 30 is located near the position of the focal point of an optical system as being a combination of the optical member with the first light-projecting lens 10A.

Figure 11:
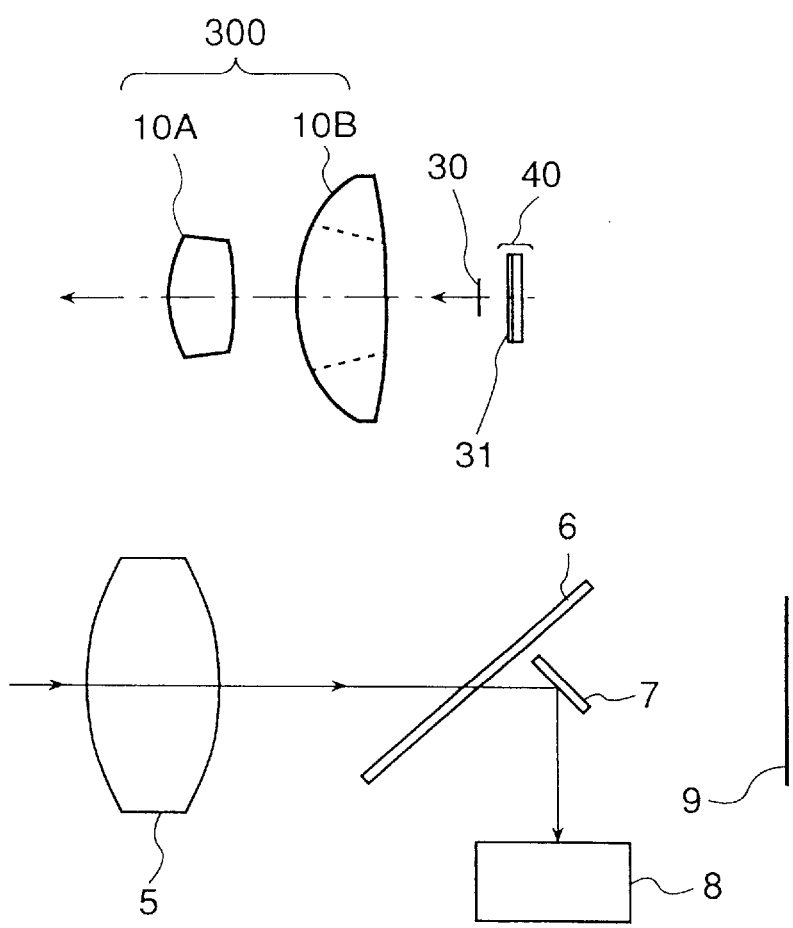
FIG. 11 is a schematic drawing of the major part when Embodiment 2 of the present invention is applied to a camera with a TTL automatic focus detection function.

FIG. 11 is a schematic drawing of the major part when the present embodiment is applied to a camera (taking system) with the TTL automatic focus detection function. In the drawings, the same elements are denoted by the same reference numerals as those in FIG. 4 and FIG. 7(A).

Since the operation is the same as that of the camera in Embodiment 1 shown in FIG. 4, the description thereof is omitted herein.

As detailed above, the present invention can provide the light-projecting system for automatic focus detection capable of performing high-accuracy focus detection because it can project the different projection patterns to the screen center area and screen peripheral areas while expanding the illumination range.

What is claimed is:

1. A light-projecting system for illuminating a central portion of a scene and a pair of peripheral portions on either side of said central portion in order to perform focus detection for each of said central portion and said pair of peripheral portions, said system comprising:

a first pattern portion for forming, upon being illuminated, a first illumination light pattern for illuminating said central portion of the scene; and one second pattern portion, common to said pair of peripheral portions, for forming, upon being illuminated, a second illumination light pattern and a third illumination light pattern, different in light intensity distribution from said first illumination light pattern, for illuminating said pair of peripheral portions separately.

2. A light-projecting system according to claim 1, wherein said first and second pattern portions are illuminated by respective light sources different from each other.

3. A light-projecting system according to claim 1, wherein one of said first and second pattern portions is a light source itself having a pattern and the other pattern portion is illuminated by said light source having the pattern.

4. A light-projecting system according to any one of claims 1 to 3, wherein the focus detection for said central portion is one to detect a phase difference in a first direction between two images, the focus detection for said peripheral portions is one to detect a phase difference in a second direction perpendicular to said first direction between the two images, a light intensity distribution of said first illumination light pattern is a stripe pattern extending in said second direction, and light intensity distributions of said second illumination light pattern and third illumination light pattern are stripe patterns extending in said first direction.

5. A light-projecting system according to claim 4, wherein said pair of peripheral portions are located to the left and right of said central portion.

6. A light-projecting system according to claim 5, wherein said first direction is a horizontal direction and said second direction is a vertical direction.

7. A light-projecting system for illuminating a central portion of a scene and a pair of peripheral portions on either side of said central portion in order to perform focus detection for each of said central portion and said pair of peripheral portions, said apparatus comprising:

a first pattern for forming, upon being illuminated, a first illumination light pattern for illuminating said central portion of the scene;

a first light-projecting lens for projecting the first illumination light pattern from said first pattern to said central portion of the scene;

a second pattern, common to said pair of peripheral portions, for forming, upon being illuminated, a second illumination light pattern and a third illumination light pattern, different in light intensity distribution from said first illumination light pattern, for illuminating said pair of peripheral portions separately; and a second light-projecting lens for projecting the second illumination light pattern from said second pattern to said pair of peripheral portions.

8. A light-projecting system according to claim 7, wherein a focal length of said second light-projecting lens is shorter than that of said first light-projecting lens.

9. A light-projecting system according to claim 7, wherein said first pattern is provided near a position of a focal point of said first light-projecting lens and said second pattern is provided near a position of a focal point of said second light-projecting lens.

10. A light-projecting system according to claim 7, wherein said first and second patterns are illuminated by respective light sources different from each other.

11. A light-projecting system according to claim 10, wherein said first light-projecting lens and said second light-projecting lens are disposed adjacent to each other in a direction parallel to the scene.

12. A light-projecting system according to claim 7, wherein one of said first and second patterns is a light source itself having a pattern and the other pattern is illuminated by said light source having the pattern.

13. A light-projecting system according to claim 12, wherein said second light-projecting lens has an aperture, through which a light beam from said first illumination light pattern passes, near an optical axis of said first light-projecting lens and wherein said first light-projecting lens and said second light-projecting lens are juxtaposed in a direction normal to the scene.

14. A light-projecting system according to any one of claims 7 to 13, further comprising means for partially deflecting light from said first illumination light pattern.

15. A light-projecting system according to any one of claims 7 to 13, wherein the focus detection for said central portion is one to detect a phase difference in a first direction between two images, the focus detection for said peripheral portions is one to detect a phase difference in a second direction perpendicular to said first direction between the two images, a light intensity distribution of said first illumination light is a stripe pattern extending in said second direction, and light intensity distributions of said second illumination light pattern and third illumination light pattern are stripe patterns extending in said first direction.

16. A light-projecting system according to claim 15, wherein said second light-projecting lens has a lens with a refractive power stronger in said second direction than in said first direction.

17. A light-projecting system according to claim 15, wherein said pair of peripheral portions are located to the left and right of said central portion.

18. A light-projecting system according to claim 17, wherein said first direction is a horizontal direction and said second direction is a vertical direction.

19. A light-projecting system according to claim 15, further comprising means for partially deflecting light from said first illumination light pattern.

20. An optical apparatus for illuminating a central portion of a scene and a pair of peripheral portions on either side of said central portion in order to perform focus detection for each of said central portion and said pair of peripheral portions, said apparatus comprising:

a first pattern portion for forming, upon being illuminated, a first illumination light pattern for illuminating said central portion of the scene; and a second pattern portion, common to said pair of peripheral portions, for forming, upon being illuminated, a second illumination light pattern and a third illumination light pattern, different in light intensity distribution from said first illumination light pattern, for illuminating said pair of peripheral portions separately.

21. An optical apparatus according to claim 20, wherein said first and second pattern portions are illuminated by respective light sources different from each other.

22. An optical apparatus according to claim 21, wherein one of said first and second pattern portions is a light source itself having a pattern and the other pattern portion is illuminated by said light source having the pattern.

23. An optical apparatus according to any one of claims 20 to 22, wherein the focus detection for said central portion is one to detect a phase difference in a first direction between two images, the focus detection for said peripheral portions is one to detect a phase difference in a second direction perpendicular to said first direction between the two images, a light intensity distribution of said first illumination light pattern is a stripe pattern extending in said second direction, and light intensity distributions of said second illumination light pattern and third illumination light pattern are stripe patterns extending in said first direction.

24. An optical apparatus according to claim 23, wherein said pair of peripheral portions are located to the left and right of said central portion.

25. An optical apparatus according to claim 24, wherein said first direction is a horizontal direction and said second direction is a vertical direction.

26. An optical apparatus for illuminating a central portion of a scene and a pair of peripheral portions on either side of said central portion in order to perform focus detection for each of said central portion and said pair of peripheral portions, said apparatus comprising:

a first pattern for forming, upon being illuminated, a first illumination light pattern for illuminating said central portion of the scene;

a first light-projecting lens for projecting the first illumination light pattern from said first pattern to said central portion of the scene;

a second pattern, common to said pair of peripheral portions, for forming, upon being illuminated, a second illumination light pattern and a third illumination light pattern, different in light intensity distribution from said first illumination light pattern, for illuminating said pair of peripheral portions separately; and a second light-projecting lens for projecting the second illumination light pattern from said second pattern to said pair of peripheral portions.

27. An optical apparatus according to claim 26, wherein a focal length of said second light-projecting lens is shorter than that of said first light-projecting lens.

28. An optical apparatus according to claim 26, wherein said first pattern is provided near a position of a focal point of said first light-projecting lens and said second pattern is provided near a position of a focal point of said second light-projecting lens.

29. An optical apparatus according to claim 26, wherein said first and second patterns are illuminated by respective light sources different from each other.

30. An optical apparatus according to claim 29, wherein said first light-projecting lens and said second light-projecting lens are disposed adjacent to each other in a direction parallel to the scene.

31. An optical apparatus according to claim 26, wherein one of said first and second patterns is a light source itself having a pattern and the other pattern is illuminated by said light source having the pattern.

32. An optical apparatus according to claim 31, wherein said second light-projecting lens has an aperture, through which a light beam from said first illumination light pattern passes, near an optical axis of said first light-projecting lens and wherein said first light-projecting lens and said second light-projecting lens are juxtaposed in a direction normal to the scene.

33. An optical apparatus according to any one of claims 26 to 32, further comprising means for partially deflecting light from said first illumination light pattern.

34. An optical apparatus according to any one of claims 26 to 32, wherein the focus detection for said central portion is one to detect a phase difference in a first direction between two images, the focus detection for said peripheral portions is one to detect a phase difference in a second direction perpendicular to said first direction between the two images, a light intensity distribution of said first illumination light pattern is a stripe pattern extending in said second direction, and light intensity distributions of said second illumination light pattern and third illumination light pattern are stripe patterns extending in said first direction.

35. An optical apparatus according to claim 34, wherein said second light-projecting lens has a lens with a refractive power stronger in said second direction than in said first direction.

36. An optical apparatus according to claim 34, wherein said pair of peripheral portions are located to the left and right of said central portion.

37. An optical apparatus according to claim 36, wherein said first direction is a horizontal direction and said second direction is a vertical direction.

38. An optical apparatus according to claim 34, further comprising means for partially deflecting light from said first illumination light pattern.

39. A light-projecting system for illuminating a scene for focus detection, said system comprising:

a pattern portion for forming illumination light for illuminating a scene;

a light-projecting lens for light-projecting the pattern portion onto the scene; and a deflecting member having fine prism portions for splitting and deflecting a portion of the illumination light.

\* \* \* \* \*

UNITED STATES PATENT AND TRADEMARK OFFICE
CERTIFICATE OF CORRECTION

PATENT NO. : 5,850,578

DATED : December 15, 1998

INVENTOR(S) : Yusuke OHMURA

It is certified that error appears in the above-identified patent and that said Letters Patent is hereby corrected as shown below:

COLUMN 1:

Line 37, "of," should read --of the--.

COLUMN 4:

Line 35, "screen." should read --the screen.--.

COLUMN 6:

Line 33, "object." should read --the object.--.

COLUMN 7:

Line 42, "the the" should read --the--.
   Line 43, "object." should read --the object.--.

UNITED STATES PATENT AND TRADEMARK OFFICE
CERTIFICATE OF CORRECTION

PATENT NO. : 5,850,578

DATED : December 15, 1998

INVENTOR(S) : Yusuke OHMURA

It is certified that error appears in the above-identified patent and that said Letters Patent is hereby corrected as shown below:

COLUMN 10:

Line 17, "light is" should read --light pattern is--.

Signed and Sealed this

Seventeenth Day of August, 1999

Attest:

Q. TODD DICKINSON

*Attesting Officer*     Acting Commissioner of Patents and Trademarks